Oct. 25, 1955

G. E. WARREN ET AL 2,721,594

FOOD DICING APPARATUS

Filed April 18, 1950

INVENTORS.
GEORGE E. WARREN,
ROBERT J. PURVIS,
By Paul A. Weilein
ATTORNEY.

Oct. 25, 1955  G. E. WARREN ET AL  2,721,594
FOOD DICING APPARATUS
Filed April 18, 1950  4 Sheets-Sheet 2
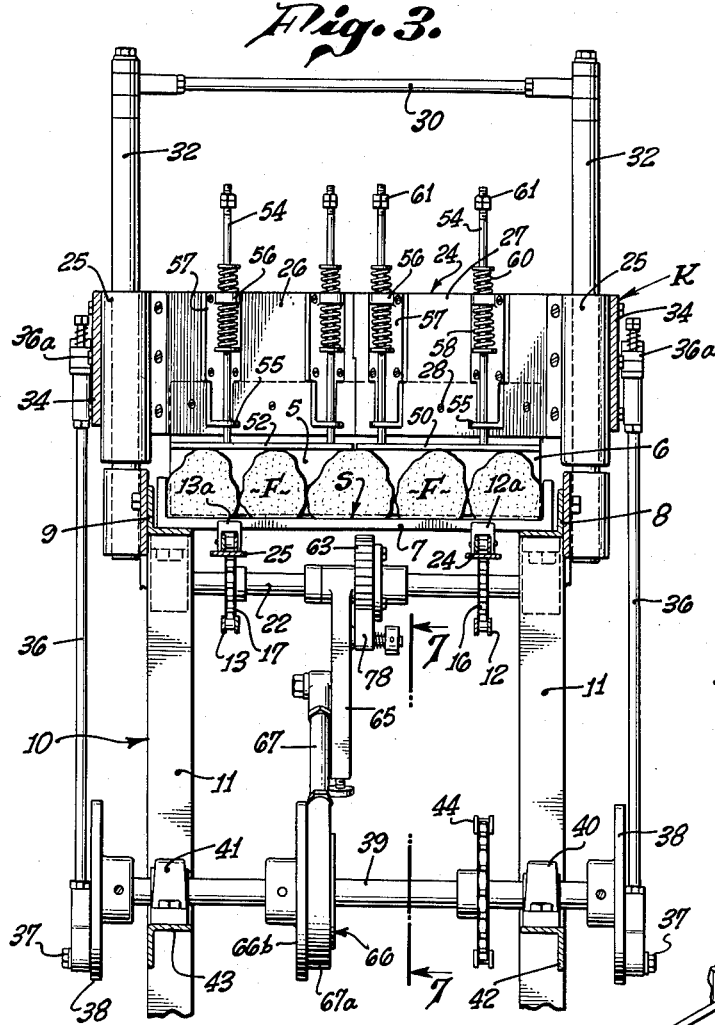
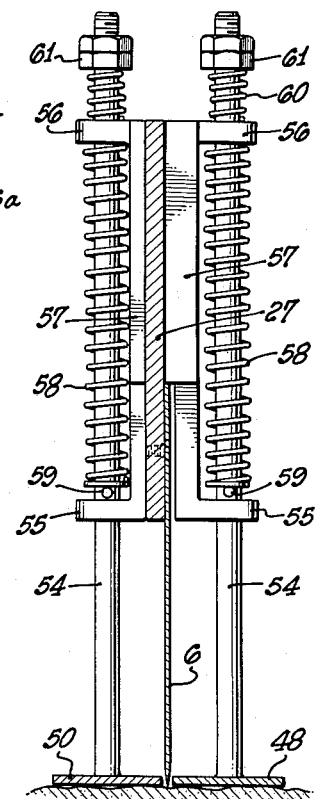
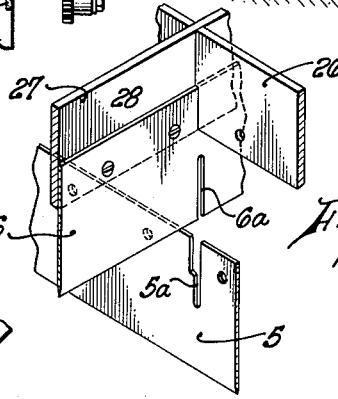
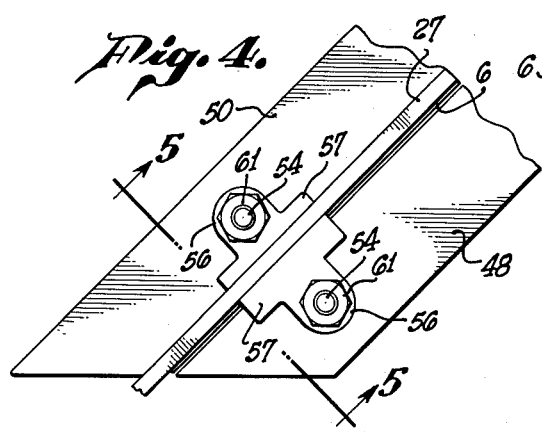
INVENTORS.
GEORGE E. WARREN,
ROBERT J. PURVIS,
By Paul A. Weilein
ATTORNEY.

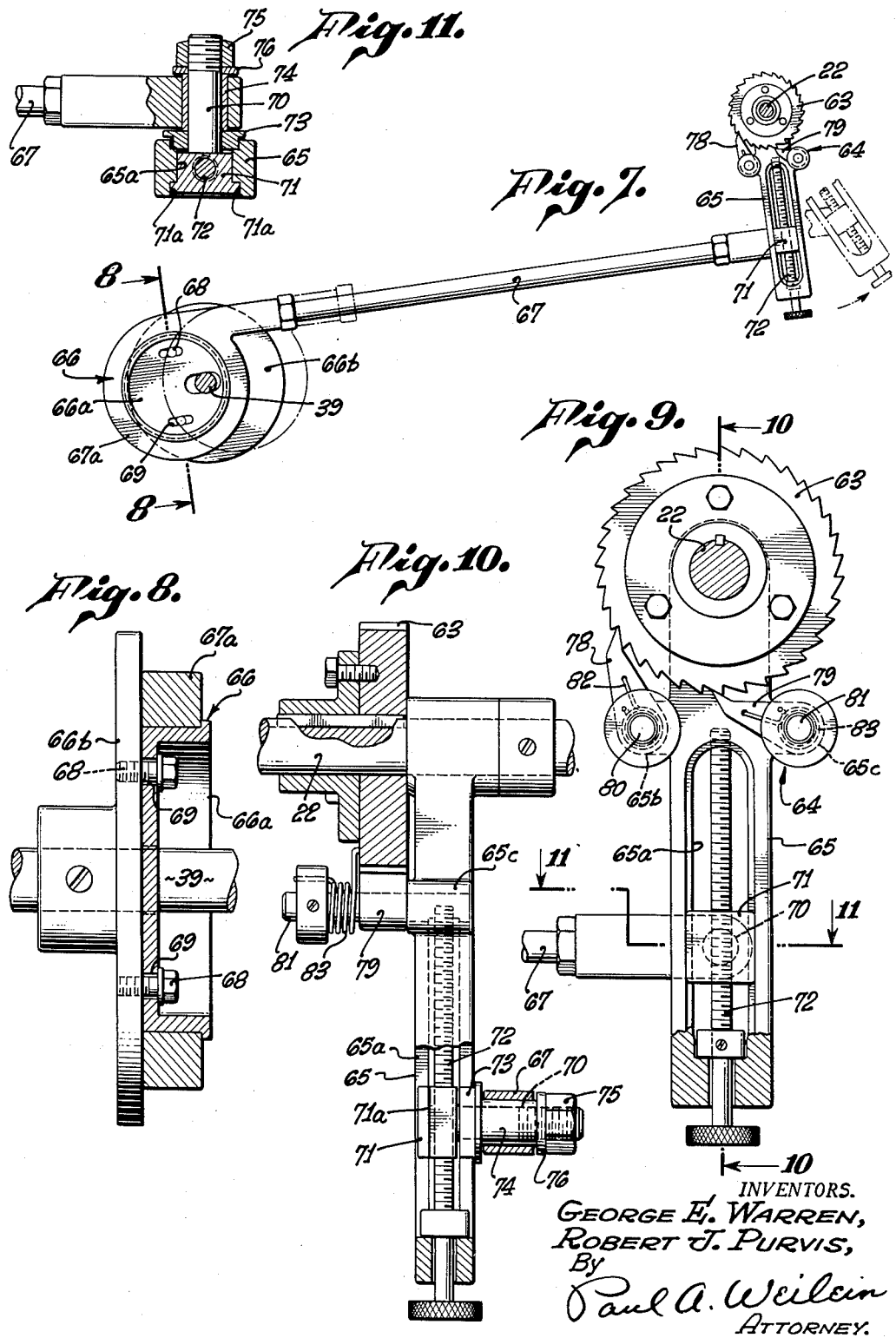

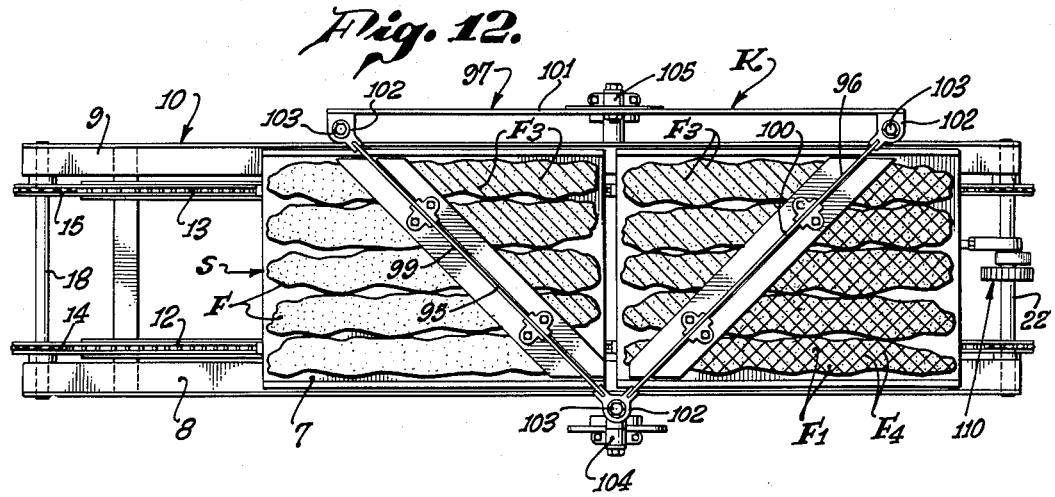
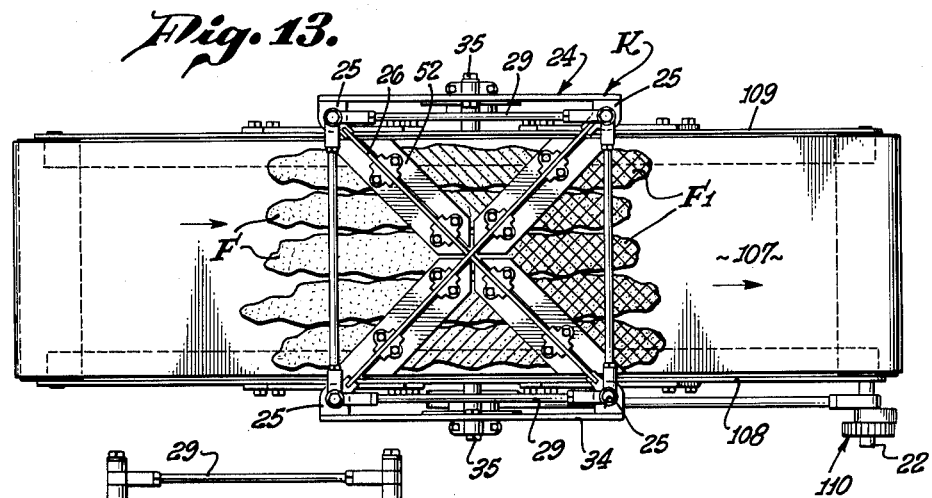
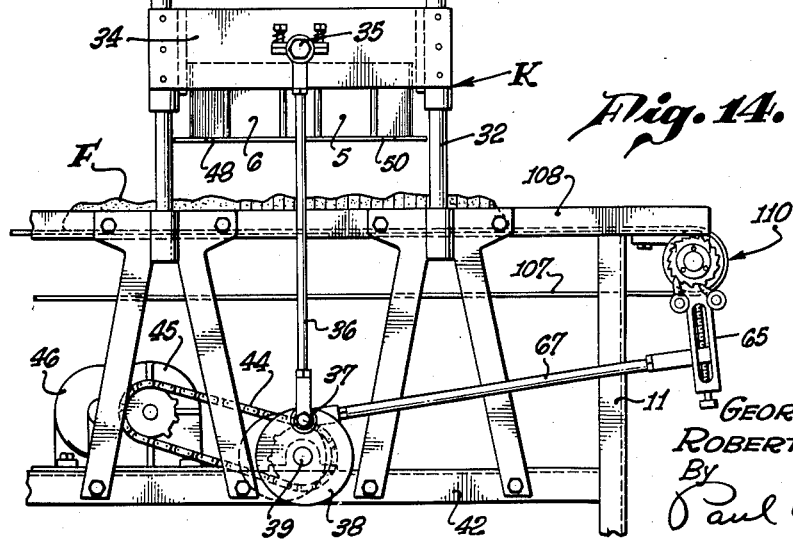
INVENTORS.
GEORGE E. WARREN,
ROBERT J. PURVIS,
By Paul A. Weilein
ATTORNEY.

United States Patent Office 2,721,594
Patented Oct. 25, 1955

2,721,594

FOOD DICING APPARATUS

George E. Warren, Long Beach, and Robert J. Purvis, Los Angeles, Calif., assignors to Luthi Machinery & Engineering Co., Inc., Gardena, Calif., a corporation of California Application April 18, 1950, Serial No. 156,544

22 Claims. (Cl. 146—78)

This invention relates to the preparation of food materials; more particularly it relates to apparatus for cutting food, such as the flesh of large fish, preparatory to packing or canning.

It is an object of this invention to provide improved apparatus of this character.

In the fish canning industry, especially in packing tuna, it is often the practice to fill the cans as far as possible with relatively large pieces or filets, selected and placed by hand, sufficient pieces of miscellaneous sizes being then added to make up the required weight. In some grades, the entire weight is made up of such miscellaneous pieces or macerated fish. In either case, the appearance of the pack is injured by the small irregular pieces, being particularly unattractive in the latter case.

It is accordingly another object of this invention to provide apparatus for cutting or dicing such fish into small generally uniform pieces for use instead of such miscellaneous sizes.

It is another object of this invention to provide apparatus which will prepare the fish in an economical manner so that it is suitable for use with automatic packing or can filling machinery.

It is another object of this invention to provide fish cutting or dicing apparatus wherein the size of the cut pieces or dice may be readily altered by small increments.

This invention possesses many other advantages, and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Figure 3 is a transverse section on an enlarged scale, taken substantially as indicated by line 3—3 of Figure 2, but showing a different operating position of the parts;

Figure 4 is a detail top plan view on enlarged scale, showing a fragment of one of the cutting elements;

Figure 5 is a vertical transverse section taken substantially as indicated by line 5—5 of Figure 4;

Figure 6 is a detail perspective of the blade construction;

Figure 7 is a detail longitudinal section taken substantially as indicated by line 7—7 of Figure 3;

Figure 8 is a cross section on an enlarged scale, taken substantially as indicated by line 8—8 of Figure 7;

Figure 9 is an enlarged elevation of the ratchet mechanism of Figure 7;

Figures 10 and 11 are sectional views, taken substantially as indicated by the correspondingly numbered lines of Figure 9;

Figure 12 is a plan view similar to Figure 1, but showing a modified form of machine;

Figure 13 is a similar view, showing another modified form; and

Figure 14 is a fragmentary side elevation thereof.

Briefly, the apparatus comprises means providing a substantially horizontal surface S for carrying the food F which is to be cut and movable beneath a knife structure K comprising a pair of diagonal cutting blades 5 and 6 oppositely directed with respect to each other and extending transversely above the surface S. Means are provided for advancing the surface S in a step-by-step manner, the knife structure K being movable toward and away from said surface to perform a cutting operation between successive steps of advance. Thus, one of the cutting blades 5 or 6 makes a series of parallel spaced cuts in the food F, the other blade making a similar series of cuts, oppositely directed and intersecting the first cuts to sever the food F into a plurality of vertically disposed sections F–1 of a square or parallelogram-like configuration, sometimes referred to as "dice." Means are provided for adjusting the distance the food F is advanced in successive steps, thus varying the size of the cut pieces or "dice" F–1.

Figure 1:
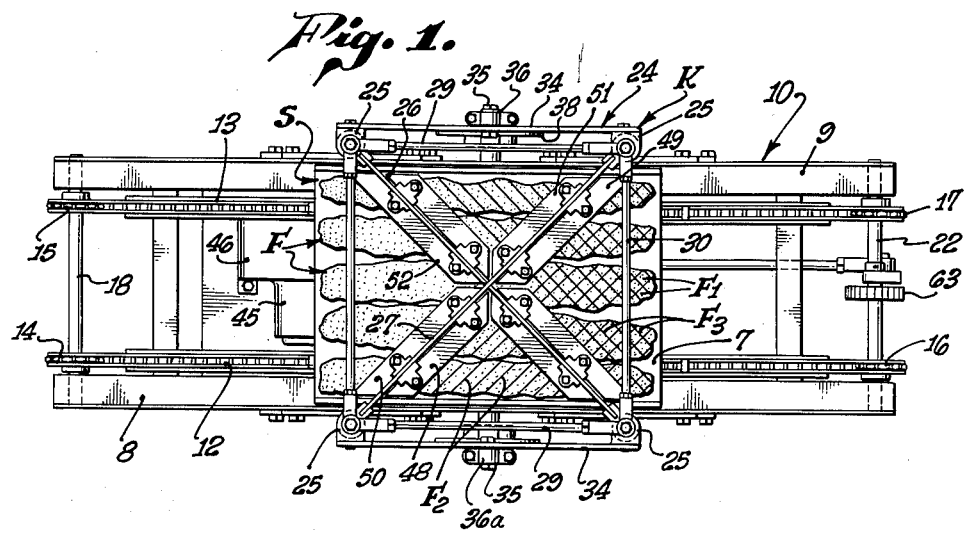
Figure 1 is a top plan view of a machine incorporating features of the invention.
Figure 2:
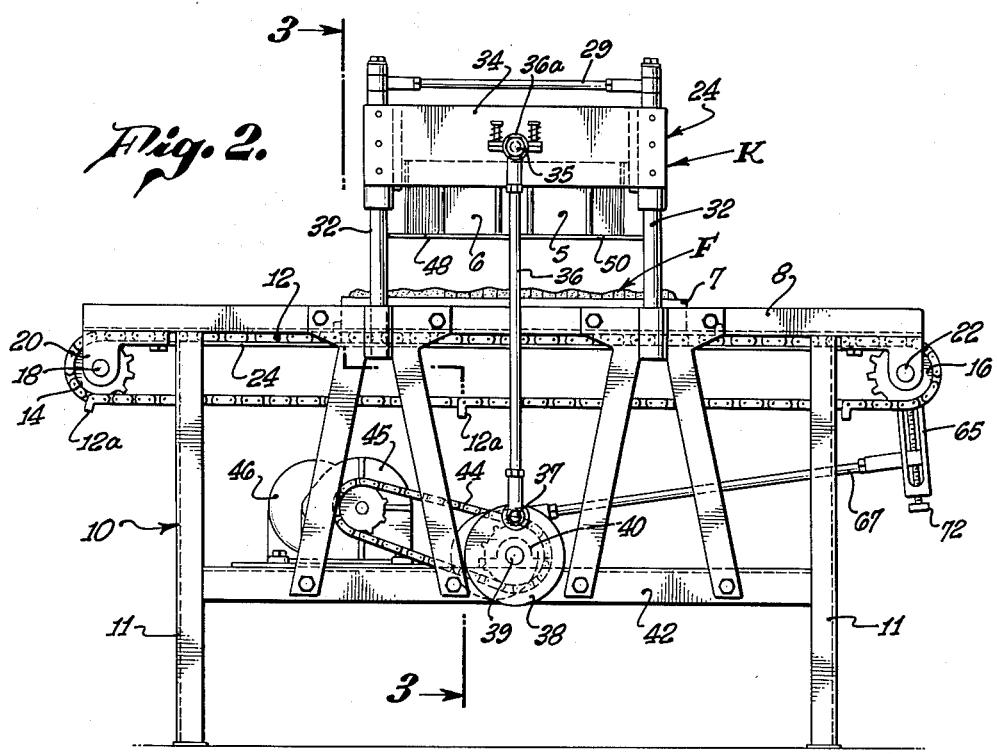
Figure 2 is a side elevation thereof.

Referring to Figures 1, 2 and 3, a tray or pallette, indicated by the numeral 7, is shown as providing the surface S for carrying the fish or other food F and be diced, such at least in the case of fish being in the form of filets, previously cooked and boned. The tray 7 is slidably supported generally horizontally by a pair of spaced parallel angle iron bars or rails 8 and 9 forming the top members of the frame 10 of the machine, which frame includes the upright members or legs 11 adapted to rest on a floor or other supporting surface.

The tray 7 is arranged to be advanced from left to right (Figures 1 and 2) by the aid of a pair of conveyor chains 12 and 13 respectively adjacent the rails 8 and 9 respectively, and movable parallel therewith. Thus, the chains 12 and 13 pass about sprocket wheels 14 and 16, and 15 and 17 respectively adjacent the opposite ends of the frame 10, the sprockets 14 and 15 being secured on a shaft 18 extending across the frame and being rotatably supported by a pair of bearings 20 secured on the under side of the members 8 and 9 respectively. The sprockets 16 and 17 are mounted on a similarly arranged shaft 22, which is driven in a step-by-step intermittent manner by mechanism to be described hereinafter.

The upper reaches of the chains 12 and 13 pass closely beneath the tray 7 being for this purpose slidably supported on bars 23a and 23b provided on the frame 10, the chains having respectively a plurality of spaced oppositely aligned projections or lugs 12–a and 13–a thereon, any pair of which is adapted to engage the rear edge of a tray 7, so that the tray is advanced with the chains. The tray 7 is placed on the rails 8 and 9, manually or otherwise, so as to be engaged by a pair of the lugs 12–a and 13–a. The chains 12 and 13 then advance the tray beneath and beyond the knife structure K, after which the tray and contents are removed manually or by suitable means, not shown.

The cutting blades 5 and 6 are disposed at 90° with respect to each other, and are oppositely directed at angles of 45° to the direction of advance of the tray 7, intersecting intermediate the edges of the tray. The blades 5 and 6 are mounted in a rectangular frame 24, formed of corner members 25 connected in spaced relation by diagonal plates 26 and 27 to which the blades 5 and 6 are respectively secured as by screws 28. As shown in Figure 6, the blades 5 and 6 are respectively notched at 5–a and 6–a to permit their assembly in crossed relation.

The corner members 25 are slidable respectively on vertical guide rods 32, mounted in pairs on opposite sides of the frame 10 and extending upwardly above the tray supports 8 and 9, being connected at their upper ends by longitudinal and transverse tie rods 29 and 30. Each side of the frame 24 is provided with a longitudinally extending plate 34, suitably secured to the corresponding corner members 25 and mounting a wrist pin 35 at its mid-point. Each wrist pin 35 is connected by a connecting rod 36 with a crank pin 37 carried by a crank disc 38, the crank discs 38 being mounted respectively at the opposite ends of a shaft 39. The crank shaft 39 is rotatably supported by bearings 40 and 41 on the longitudinal frame members 42 and 43 and is connected by a chain drive 44 and speed reducer 45 with the driving motor 46.

The arrangement is such that rotation of the crank shaft 39 imparts movement to the knife structure K toward and away from the food support surface S, the cutting blades 5 and 6 at the upper limit of such movement being spaced substantially above the food F so as not to hinder its advance beneath the blades, and at the lower limit of such movement being closely spaced above the surface S but not in contact therewith, so as to substantially completely sever the food sections or dice, and at the same time avoid injury to the surface.

It may be desirable to provide some resilience in the driving mechanism, for which purpose the connecting rods 36 are each provided with a horizontally split wrist pin bearing having a spring pressed cap 36-a.

To prevent the food F adhering to the cutting blades 5 and 6 and being elevated therewith after a cutting stroke, a pair of horizontal stripper plates 48, 49 and 50 and 51, normally flush with the cutting edge of the blade, are provided on each side of the blade 6 (see particularly Figures 4 and 5). Similar plates or members, generally indicated by the numeral 52, are provided for the blade 5, and since their arrangement is substantially identical, only the members associated with blade 6 will be described.

Thus, each of the stripper plates 48, 49, 50 and 51 is secured as by welding to the lower ends of a pair of vertically extending rods 54 slidably mounted in a pair of spaced guide lugs 55 and 56 formed on a bracket 57 secured to the mounting plates 26 and 27. A compression spring 58 confined between the upper lug 56 and a stop pin 59 in the rod 54 resiliently maintains the associated plate 48, etc., flush with the blade edge, the arrangement being such that when the knife structure K moves downwardly on the cutting stroke, the stripper plates 48, etc., engage the upper surface of the food F and are held against further downward movement thereby while the blades 5 and 6 complete their downward cutting stroke through the food (see Figure 3). Thus, the stripper plates exert a resilient force on the food which continues driving the upward stroke of the knife structure K until the blades are clear of the food, effectively preventing the food from adhering to the blades. A short compression spring 60 rests on the upper guide lug 56 and by contact with an adjustable stop 61 on the rod 54 serves to cushion the contact of the stop pin 59 with the bottom guide lug 55.

For advancing the conveyor chains 12 and 13 together with the food tray or trays 7, a ratchet wheel 63 is secured on the shaft 22 (see particularly Figures 7, 9 and 10) for operation by a pawl structure 64 comprising an arm 65 oscillatably mounted on the shaft and forming with the ratchet wheel 63, a one way clutch.

The arm 65 is oscillated by an eccentric structure 66 on the drive shaft 39, being connected therewith by means including a rod 67. The eccentric structure 66 comprises a circular member 66-a eccentrically mounted on a disc 66-b fixed on shaft 39 and radially adjustable to provide a crank arm of variable radius, being secured in adjusted position by the aid of screws 68 threaded into the disc 66-b and engaging slotted holes 69 in the member 66-a.

The rod 67 includes an eccentric strap 67-a at one end embracing the member 66-a and at its other end engages a pin 70 projecting from a block 71 mounted on the arm 65. This block 71 is slidable on guide ways 65-a provided in arm 65 to vary the effective radius thereof, being adjusted by a radially extending threaded rod 72 carried by the arm 65 and passing through the block. As clearly shown in Figures 10 and 11, the block 71 has lips 71-a overhanging the outer faces of the guide ways 65-a and is of slightly less thickness than the width of the guides 65-a. A rectangular washer 73 through which the pin 70 passes engages the inner faces of the guides 65-a, a bushing or sleeve 74 being provided on the pin 70 on which the eccentric rod 67 is adapted to oscillate, said bushing being somewhat longer than the thickness of the rod end. A nut 75 is threaded on the outer end of the pin 70, a washer 76 being interposed between the nut and the end of the bushing 74.

The arrangement is such that tightening the nut 75 will draw the block 71 and rectangular washer 73 into clamping engagement with the guides 65-a to secure the block 71 in adjusted position, the eccentric rod 67 remaining free to oscillate on bushing 74 due to the clearance provided between the end of the rod 67 and the washers 73 and 76. It will be obvious that by means of the threaded rod 72 the effective radius of arm 65 may be adjusted by very small increments.

To render such small adjustments effective on the ratchet wheel 63 without the need of very fine teeth thereon, a pair of pawls 78 and 79 are provided on the arm 65. Thus, the forward and rear edges of the arm 65 are provided with ears 65-b and 65-c carrying pins 80 and 81 on which the pawls 78 and 79 are rotatably mounted, springs 82 and 83 serving to urge the pawls to engage the ratchet wheel 63, the parts being so proportioned that the pawls contact the wheel at points thereon spaced a number of full teeth plus a half tooth apart.

Thus, it will be seen that a fine as well as a coarse adjustment are provided for varying the magnitude of the steps by which the food F is advanced and hence the size of the dice, viz., adjustment of the eccentric structure 66 which is seldom altered, and adjustment of the effective length of the arm 65. Proper timing of the advance is obtained by correct angular relationship between the crank pins 37 on discs 38 and the eccentric member 66-a on disc 66-b on shaft 39.

In Figure 12, a food dicer is shown which is substantially identical with that just described except for a modified form of knife structure K wherein the blades 95 and 96 do not intersect and the supporting frame 97 therefor is accordingly triangular including the blade mounting plates 99 and 100 joined by a longitudinal plate 101, there being a guide member 102 at each corner of the frame 97 connecting the adjacent ends of the plates and slidable on vertical guide rods 103 as before. One of the connecting rods 104 is connected to that guide member 102 at the apex of the triangle, the other connecting rod 105 being connected to the base of the triangle plate 101, at a point opposite thereto.

In Figures 13 and 14, a food dicer is shown which is substantially identical with the first described form of the invention, except for the provision of a continuous belt 107 for supporting and advancing the food F. This belt 107 may be of any suitable material for example stainless steel, and is shown with the opposite edges of its upper reach slidingly supported in the top frame members 108 and 109 in a manner similar to that of the tray 7. The ratchet mechanism 110 for advancing the belt 107 is located exteriorly of the frame, but is otherwise identical with the first form.

It is believed that the manner of using the apparatus should be obvious from the foregoing. With the apparatus in operation, the food to be diced, such as the fish filets F, arranged either on trays 7 or the belt 107, is advanced beneath the knife structure K in a step by step or intermittent manner, the strokes of the knife structure occurring during the periods of dwell between successive steps of advance. The cutting blade or blade portions initially encountered form diagonal parallel cuts as F–3 in the food material spaced in accordance with the steps of advance, the following blade or blade portions forming oppositely inclined parallel cuts as F–4 intersecting the cuts F–3 to form the diced food section F–1. By varying the magnitude of the steps of advance, the size of such sections F–1 may be altered. The previously described advancing mechanism permits of very close adjustment, of the order for example of 1/32 of an inch.

We claim:

1. In a dicing apparatus for food materials: means providing a substantially horizontal movable surface for carrying said materials; means for advancing said surface in a step by step manner; a pair of cutting blades having straight cutting edges equal in length to that of the blades, said blades extending transversely above said surface at substantially equal and opposite angles with respect to the direction of movement of said surface, and being so spaced as to intersect, if continued beyond an edge of said surface; means forming a generally triangular frame mounting said blades with said cutting edges disposed in a plane substantially parallel with said surface; guide means respectively adjacent the apices of said triangle, slidably engaging and guiding said frame for movement toward and away from said surface; and means for operating said frame through a cycle of movement between periods of advance of said surface to cause said blades to perform a cutting operation.

2. In a dicing apparatus for food materials: means providing a substantially horizontal movable surface for carrying said materials; means for advancing said surface in a step by step manner; a pair of cutting blades having straight cutting edges equal in length to that of the baldes, said blades extending transversely above said surface at substantially equal and opposite angles with respect to the direction of movement of said surface, and being so spaced as to intersect intermediate the edges of said surface; means forming a generally rectangular frame mounting said blades with said cutting edges disposed in a plane substantially parallel with said surface; guide means respectively adjacent the corners of said rectangle slidably engaging and guiding said frame for movement toward and away from said surface; and means for operating said frame through a cycle of movement between periods of advance of said surface to cause said blades to perform a cutting operation.

3. In a dicing apparatus for food materials: means providing a substantially horizontal movable surface for carrying said materials; means for advancing said surface in a step by step manner; a pair of angularly disposed cutting blades converging from one edge of said surface in a direction transverse to the direction of movement of said surface, and so positioned as to intersect at a point intermediate the edges of said surface; said blades having straight cutting edges substantially equal in length to that of said blades; and means mounting said blades with said cutting edges disposed in a plane parallel with said surface.

4. In a dicing apparatus for food materials: means providing a substantially horizontal movable surface for carrying said materials; means for advancing said surface in a step by step manner; a pair of cutting blades having straight cutting edges; said blades being extended one in advance of the other in the direction of movement of said surface at substantially equal and opposite angles, and being so converged as to intersect intermediate the edges of said surface; means forming a generally rectangular frame mounting said blades; said frame maintaining said cutting edges in a plane substantially parallel with said surface; guide means respectively adjacent the corners of said rectangle slidably engaging and guiding said frame for movement toward and away from said surface; and means for operating said frame to cause said blades to perform a cutting operation, comprising a pair of members connected respectively to opposite sides of the frame at points intermediate the ends of said blades.

5. In apparatus for dicing food materials: means providing a substantially horizontal surface for advancing said materials; a pair of cutting blades having cutting edges extending in straight lines substantially throughout the length of said blades; said edges being angularly disposed with respect to each other and having portions extending transversely above said surface so as to converge from one side of said surface in a direction transverse to the direction of advance of said surface; means mounting said blades for movement toward and away from said surface; said mounting means supporting said blades with the cutting edges thereof in a plane substantially parallel with said surface; means for operating said blades to perform a cutting operation; and means for stripping the cut material from said blades comprising a member extending lengthwise of each blade, normally flush with the cutting edge thereof and engageable with said material upon cutting movement of the blade; means mounting said members for movement in a direction parallel with the movement of said blades; and means resiliently urging said members to move with the blades.

6. In apparatus for dicing food materials: means providing a substantially horizontal food carrying surface; a cutting blade having a cutting edge extending in a straight line substantially throughout the length of said blade and extending transversely above said surface; means forming a support mounting said blade for movement toward and away from said surface; said support holding said blade with its cutting edge in a plane substantially parallel with said surface; means for operating said blade to perform a cutting operation; and means for stripping the cut material from said blade, comprising a member extending lengthwise of the blade, normally flush with the cutting edge and engageable with said material upon cutting movement of the blade; means mounting said member on said support for movement in a direction parallel with the movement of said blade and independently thereof; and means resiliently opposing independent movement of said member.

7. In apparatus for dicing food materials: means providing a substantially horizontal food carrying surface; a cutting blade having a cutting edge extending in a straight line substantially the full length of said blade, said edge extending transversely above said surface; means forming a support mounting said blade with said cutting edge in a plane substantially parallel with said surface and for movement toward and away from said surface; means for operating said blade to perform a cutting operation; and means for stripping the cut matetrial from said blade, comprising a member extending lengthwise of the blade, normally flush with the cutting edge and engageable with said material upon cutting movement of the blade; a pair of spaced guide lugs on said support; a stem-like upward extension on said member, slidably engaging said lugs for movement in a direction parallel with the movement of said blade; spring means confined between one of said lugs and a projection on said extension, resiliently urging said member toward its normal position; and means engageable with one of said lugs to prevent movement of said blade beyond said position.

8. Food cutting apparatus, comprising, means for advancing food in a step by step movement along a given path, cutting blades, means mounting said blades for movement toward and away from said path to cut the food thereon, said blades being converged in a direction transverse to the direction of advance of the food, said blades intersecting one another intermediate the ends thereof, and means for so moving said blades.

9. Food cutting apparatus, comprising means for advancing food along a given path, a pair of cutting blades, means mounting said blades for movement toward and away from said path to cut food thereon, said blades extending diagonally of said path so as to intersect one another between the side margins of said path and dispose portions thereof on each side of the intersection, one in advance of the other in the direction of advance of the food, and means for moving said blades toward and away from said path.

10. Food cutting apparatus, comprising means for advancing food along a given path, a pair of cutting blades, means mounting said blades for movement toward and away from said path to cut food thereon, said blades extending diagonally of said path so as to intersect one another between the side margins of said path, with portions thereof on each side of said intersection converging from the adjacent side of the path toward the intersection in a direction transverse to the directions of advance of the food, and means for moving the blades toward and away from said path.

11. In food cutting apparatus: means providing a substantially horizontal food carrying surface; means for advancing said surface; a pair of cutting blades disposed one in advance of the other in the direction of advance of said surface and converging in a direction transverse to said direction of advance; means mounting said blades so that the cutting edges thereof are maintained above said surface in a plane substantially parallel with said surface; and means for simultaneously moving said blades downwardly to cause said edges to pass substantially completely through said food.

12. In food cutting apparatus: means providing a substantially horizontal food carrying surface comprising a continuous belt; means for operating said belt to advance said surface; a pair of cutting blades having portions converging from one side of said surface toward the other side of said surface; means mounting said blades so that the cutting edges thereof are maintained above said surface in a plane substantially parallel with said surface; and means for simultaneously moving said blades downwardly to cause said edges to pass substantially completely through said food.

13. In food cutting apparatus: means providing a substantially horizontal food carrying surface; means for advancing said surface in a step by step manner; a pair of cutting blades mounted one in advance of the other in the direction of advance of said surface and converging in a direction transverse to the direction of said advance; means mounting said blades over said surface for movement toward and away from said surface to perform a cutting operation; said blades having cutting edges thereof disposed in a plane substantially parallel with said surface; and means for operating said blades during periods of dwell of said surface to cause said edges to pass substantially completely through said food.

14. In apparatus for dicing food materials: means providing a substantially horizontal movable surface for carrying said material; means for advancing said surface in a step-by-step manner; a pair of cutting blades having straight cutting edges; said blades being angularly disposed with respect to each other and extending transversely over said surface one in advance of the other in the direction of movement of said surface; means forming a triangular frame for maintaining said cutting edges in a plane substantially parallel with said surface; said blades having their ends secured respectively to corners of said triangular frame; upright posts mounted on opposite sides of said surface slidably supporting the corners of said frame; and means for moving said frame to cause said blades to simultaneously cut through food materials on said surface.

15. In food cutting apparatus: means providing a substantially horizontal food advancing surface having side edges; a pair of cutting blades extending convergently from each of said side edges over said surface in a direction transverse to the direction of said advance; and means for effecting relative movement between said blades and said surface for cutting through food on said surface.

16. In a food cutting apparatus: means providing a food advancing surface, blades for making cuts diagonally across and through food on said surface, means mounting said blades in a plane substantially parallel with said surface; said blades intersecting one another intermediate margins of said surface; the portions of said blades on each of the point of intersection of the blades being spaced in the direction of advance of the food; means for effecting relative movement between said blades and said surface for making diagonal cuts through said food which cuts intersect the diagonal cuts made incident to the first named relative movement between said knife means and said surface.

17. Food cutting apparatus comprising, means for advancing food along a given path, a pair of angularly related cutting blades having straight cutting edges extending convergently from each side of said path toward the center of said path, means mounting said blades for movement toward and away from cutting engagement with food on said path, and means for so moving said blades.

18. Food cutting apparatus, comprising: means for advancing food in a step by step movement along a given path, cutting blades, a rectilinear frame movable toward and away from said path to cut the food thereon, said blades having ends thereof secured to the corners of said frame; upright guide members extending through said corners to slidably guide said frame; said blades being converged in a direction transverse to the direction of advance of the food, said blades intersecting one another intermediate the ends thereof, and means for moving said frame to move said blades into and out of position for cutting through said food.

19. Food cutting apparatus, comprising, means for supporting food for advance in a given path, blades, means mounting said blades with the cutting edges thereof converging from opposite sides of said path and intersecting one another intermediate said sides; means for moving said blades into position to cut through said food; and means for effecting relative step-by-step movement between said food and said blades in a direction transverse to the direction in which said edges converge, whereby the cuts made by said cutting edges will intersect one another and dice said food.

20. Food cutting apparatus, comprising means for supporting a row of pieces of food for advance in a given path, with the row extending transversely of said path, blades, means mounting said blades with the cutting edges thereof converging from opposite sides of said path and intersecting one another intermediate said sides; means for moving said blades into position to cut through said food; and means for effecting relative step-by-step movement between said row and said blades in a direction transverse to the direction of convergence of said edges whereby the cuts made by said cutting edges will intersect one another and dice the pieces in said row.

21. Food cutting apparatus, comprising means forming a support for food adapted to be advanced on said support in a given path, blades, means supporting said blades with their cutting edges intersecting one another at a point approximately centrally of the sides of said path and extending divergently from the point of intersection to said sides; means for moving said blades toward and away from said support; and means for effecting relative step-by-step movement between said food and said blades in a direction transverse to the direction in which the edges diverge, whereby the cuts made by said cutting edges will intersect one another and dice said food.

22. Food cutting apparatus, comprising means forming a support for food adapted to be advanced on said suport in a given path; cutting blades; a frame suporting said blades with their cutting edges converging from opposite sides of and above said path, said edges intersecting one another at points approximately centrally of the ends thereof, said edges being disposed in a plane substantially parallel with said support; means for moving said blades toward and away from said support; and means for effecting relative step-by-step movement of said food and said blades in a direction whereby the successive cuts made by said cutting edges will intersect the previously made cuts and dice food disposed throughout the width of said path.

References Cited in the file of this patent

UNITED STATES PATENTS

| | | |
|---|---|---|
| 164,767 | Rochow | June 22, 1875 |
| 318,101 | Gerber | May 19, 1885 |
| 364,641 | Gathmann | June 14, 1887 |
| 629,785 | Foster | Aug. 1, 1899 |
| 862,927 | Motter | Aug. 13, 1907 |
| 1,516,828 | Rundell | Nov. 25, 1924 |
| 1,595,502 | Cox | Aug. 10, 1926 |
| 1,610,236 | Ayars | Dec. 14, 1926 |
| 1,621,012 | Head et al. | Mar. 15, 1927 |
| 1,735,406 | Moore | Nov. 12, 1929 |
| 2,103,317 | Cavagnaro | Dec. 28, 1937 |
| 2,130,937 | Urschel | Sept. 20, 1938 |

FOREIGN PATENTS

| | | |
|---|---|---|
| 904 | Germany | Aug. 4, 1877 |
| 140,788 | France | Jan. 27, 1881 |
| 15,283 | Germany | Nov. 11, 1881 |